US010775016B1

(12) United States Patent
Salter et al.

(10) Patent No.: US 10,775,016 B1
(45) Date of Patent: Sep. 15, 2020

(54) VEHICLE LIGHTING SYSTEM (71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/375,313

(22) Filed: Apr. 4, 2019

(51) Int. Cl.
*F21S 43/20* (2018.01)

(52) U.S. Cl.
CPC .................... *F21S 43/26* (2018.01)

(58) Field of Classification Search
CPC ........................................... F21S 43/26
See application file for complete search history.

(56) References Cited

U.S. PATENT DOCUMENTS

| 4,652,979 | A | 3/1987 | Arima |
| 4,722,023 | A | 1/1988 | Arima et al. |
| 6,097,549 | A | 8/2000 | Jenkins et al. |
| 6,650,058 | B1 * | 11/2003 | Wang ............... B60Q 1/0052 315/82 |
| 7,148,313 | B2 | 12/2006 | Koga et al. |
| 7,290,908 | B2 | 11/2007 | Amano et al. |
| 7,527,405 | B2 | 5/2009 | Tatsukawa |
| 8,258,704 | B2 | 9/2012 | Brant |
| 8,587,199 | B2 | 11/2013 | Hamazu et al. |
| 9,421,902 | B2 | 8/2016 | Kowatski |
| 9,821,743 | B2 | 11/2017 | Zhang et al. |
| 9,855,888 | B1 | 1/2018 | Dellock et al. |
| 2005/0068785 | A1 | 3/2005 | Takeda et al. |
| 2008/0100023 | A1 | 5/2008 | Ross et al. |
| 2012/0280528 | A1 | 11/2012 | Dellock et al. |
| 2013/0003370 | A1 | 1/2013 | Watanabe |
| 2015/0036340 | A1 | 2/2015 | Schwaighofer et al. |
| 2016/0290586 | A1 | 10/2016 | Shido et al. |
| 2017/0210282 | A1 | 7/2017 | Rodriguez Barros |
| 2018/0118101 | A1 | 5/2018 | Salter et al. |
| 2019/0301705 | A1 | 10/2019 | Schickel et al. |
| 2020/0063937 | A1 | 2/2020 | Salter et al. |

FOREIGN PATENT DOCUMENTS

| DE | 102004050600 A1 | 4/2006 |
| DE | 102015118167 A1 | 4/2016 |
| EP | 3081543 A1 | 10/2016 |
| GB | 2517789 A | 3/2015 |

OTHER PUBLICATIONS

Willits Power and Hardware, Continues-US Underglow Plug-in LED Under Cabinet Light Tape—UG80WW, Retrieved on Jul. 13, 2018, copyrighted 2018 from www.willitspower.doitbest.com/products/500014.

* cited by examiner

*Primary Examiner* — Thomas M Sember
(74) *Attorney, Agent, or Firm* — David Coppiellie; Price Heneveld LLP (57) ABSTRACT

A lighting assembly for a vehicle is provided. The lighting assembly includes a light source fixed to a vehicle mount structure to direct light toward ground level, and a lens covering the light source, wherein the lens includes an outer surface having a sawtooth profile, wherein the sawtooth profile is oriented at an angle in the range of approximately 30 to 60 degrees, and more preferably of approximately 45 degrees relative to a longitudinal or lateral axis of the vehicle.

11 Claims, 6 Drawing Sheets

VEHICLE LIGHTING SYSTEM

FIELD OF THE INVENTION

The present invention generally relates to vehicle lighting, and more particularly relates to a method and apparatus for ground effect lighting around a vehicle.

BACKGROUND OF THE INVENTION

Illumination systems used in vehicles can offer attractive viewing experiences. For example, puddle lamps have been utilized to illuminate a beam of light onto a ground surface in an area adjacent to the vehicle door when the door is to be opened. Thus, it is desirable to provide even more enhanced lighting applications by incorporating additional illumination systems in unique portions of the vehicle to provide accent as well as functional lighting.

SUMMARY OF THE INVENTION

According to one aspect of the present invention, a lighting assembly for a vehicle is provided. The lighting assembly includes a light source fixed to a vehicle mount structure to direct light toward ground level, and a lens covering the light source, wherein the lens includes an outer surface having a sawtooth profile, and wherein the sawtooth profile is oriented at an angle in the range of approximately 30 to 60 degrees relative to a longitudinal or lateral axis of the vehicle.

Embodiments of the first aspect of the invention can include any one or a combination of the following features:
  the angle is in the range of approximately 40 to 50 degrees;
  the angle is approximately 45 degrees;
  the lighting assembly is located on a first side of the vehicle, wherein the vehicle has another lighting assembly located on an opposite side of the vehicle;
  the lighting assembly is located on a first rocker panel and another lighting assembly is located on a second rocker panel;
  the lighting assembly is located near a rear of the vehicle;
  the lighting assembly is located on a rear bumper;
  the light source comprises at least one first color light source and at least one second color light source; and
  the sawtooth profile includes a plurality of teeth that are spaced apart from each other by a flat surface.

According to another aspect of the present invention, a vehicle is provided that includes a first lighting assembly located on a side of the vehicle for illuminating light directed downward toward ground level. The first light assembly comprises a light source fixed to a vehicle mount structure and a lens covering the light source, wherein the lens includes an outer surface having a sawtooth profile, wherein the sawtooth profile is oriented at an angle in the range of approximately 30 to 60 degrees relative to a longitudinal or lateral axis of the vehicle. The vehicle also includes a second lighting assembly located on a side of the vehicle for illuminating light directed downward toward ground level. The second lighting assembly comprises a light source fixed to a vehicle mount structure and a lens covering the light source, wherein the lens includes an outer surface having a sawtooth profile, and wherein the sawtooth profile is oriented at an angle in the range of approximately 30 to 60 degrees relative to a longitudinal or lateral axis of the vehicle.

Embodiments of the second aspect of the invention can include any one or a combination of the following features:
  the first lighting assembly is located proximate to a rocker panel on a first side of the vehicle and the second lighting assembly is located proximate to a second rocker panel on an opposite side of the vehicle;
  the first lighting assembly is located at a rear of the vehicle and the second light source is located at the rear of the vehicle;
  the angle is in the range of approximately 40 to 50 degrees; and
  the angle is approximately 45 degrees.

According to a further aspect of the present invention, a method of configuring a vehicle with ground lighting is provided. The method includes the step of providing first and second lighting assemblies having respective first and second light sources and first and second lenses covering the respective first and second light sources, wherein the second lighting assembly is rotated 180 degrees relative to the first lighting assembly. The method also includes the step of fixing the first lighting assembly on a first side of the vehicle to provide ground effect lighting, wherein the first lens includes an outer surface having a sawtooth profile oriented at an angle in the range of approximately 30 to 60 degrees relative to a longitudinal axis or a lateral axis of the vehicle. The method further includes the steps of fixing the second lighting assembly on an opposite side of the vehicle to provide ground lighting, wherein the second lens includes an outer surface having a sawtooth profile oriented at an angle in the range of approximately 30 to 60 degrees relative to the longitudinal axis or lateral the axis of the vehicle, and activating the first and second lighting assemblies to generate ground effect lighting.

Embodiments of the third aspect of the invention can include any one or a combination of the following features:
  the method further includes the step of fixing a third lighting assembly at a rear of the vehicle and a fourth lighting assembly at the rear of the vehicle;
  the angle is in the range of approximately 40 to 50 degrees;
  the angle is approximately 45 degrees.
  the lighting assembly is located on a first rocker panel and another lighting assembly is located on a second rocker panel; and
  the lighting assembly is located on a rear bumper.

The embodiments, examples, and alternatives of the preceding paragraphs, the claims, or the following description and drawings, including any of their various aspects or relative individual features, may be taken independently or in any combination. Features described in connection with one embodiment are applicable to all embodiments, unless such features are incompatible.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

This disclosure describes a method and apparatus of providing a vehicle ground lighting with lighting assemblies that are fixed to a vehicle mount structure to direct light toward ground level.

Figure 1:
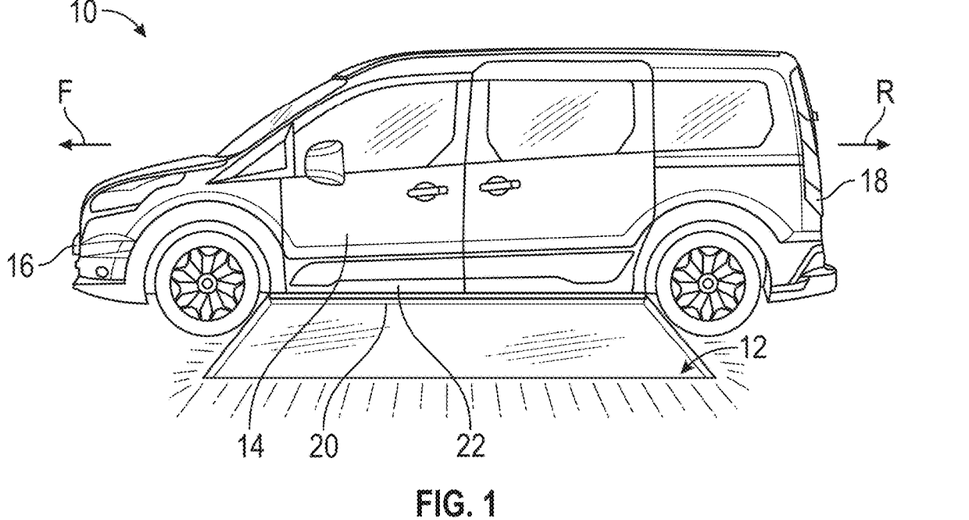
FIG. 1 is a side view of a vehicle incorporating an illumination system that provides ground effect lighting, according to one embodiment.

FIG. 1 shows an example of a vehicle 10 having an illumination system 12 that provides ground effect lighting. The light illumination may be projected approximately one to two feet laterally outwardly from a side panel 14 of the vehicle 10 in one example. While not shown in FIG. 1, the illumination system 12 can also project light outwardly from a front 16 of the vehicle 10 and from a rear 18 of the vehicle. In one example, lighting assemblies from the illumination system 12 are mounted to a ground facing surface 20 of a rocker panel 22.

Figure 2:
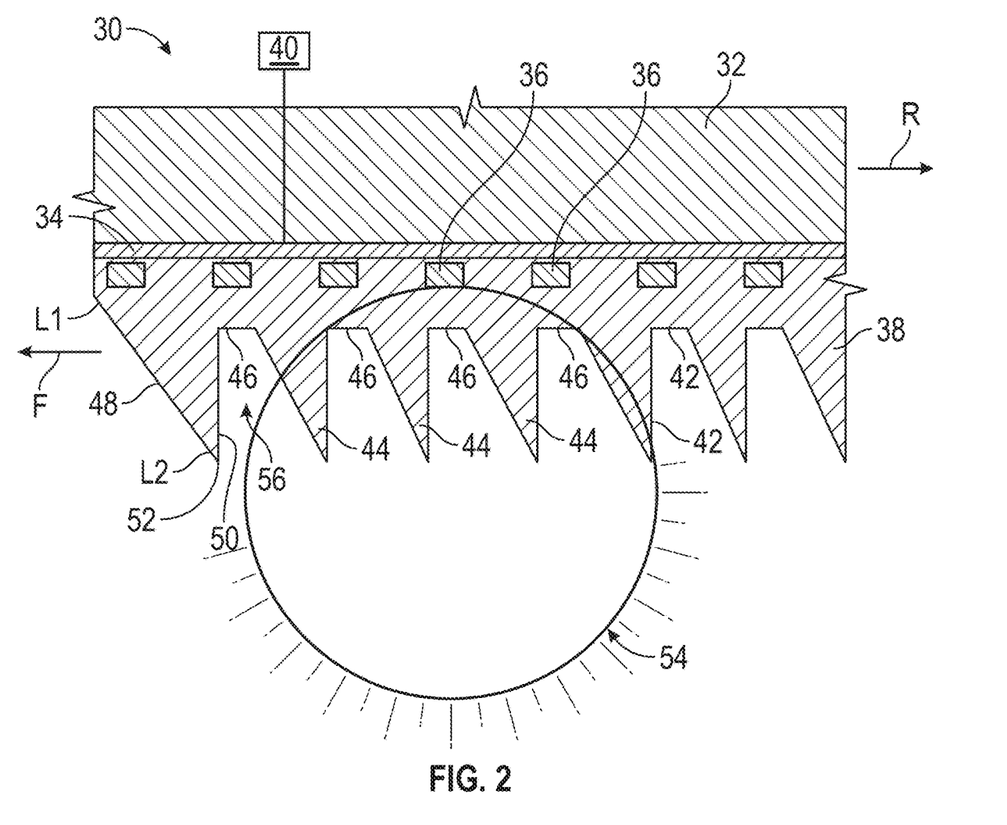
FIG. 2 is a schematic representation of a lighting assembly as used in the illumination system of FIG. 1, according to one embodiment, wherein a radiation pattern of light is shown.
Figure 3:
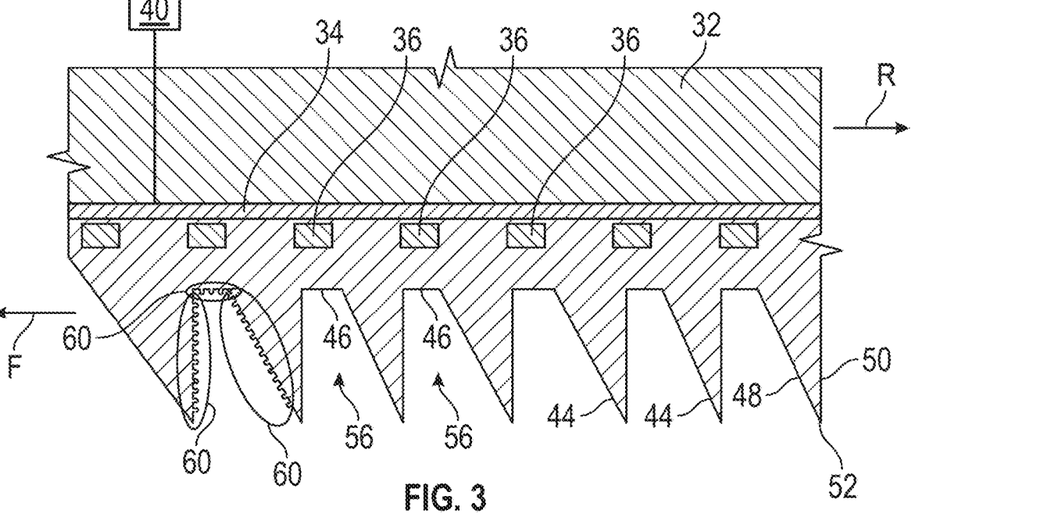
FIG. 3 is a schematic representation of the lighting assembly, according to another embodiment.
Figure 4:
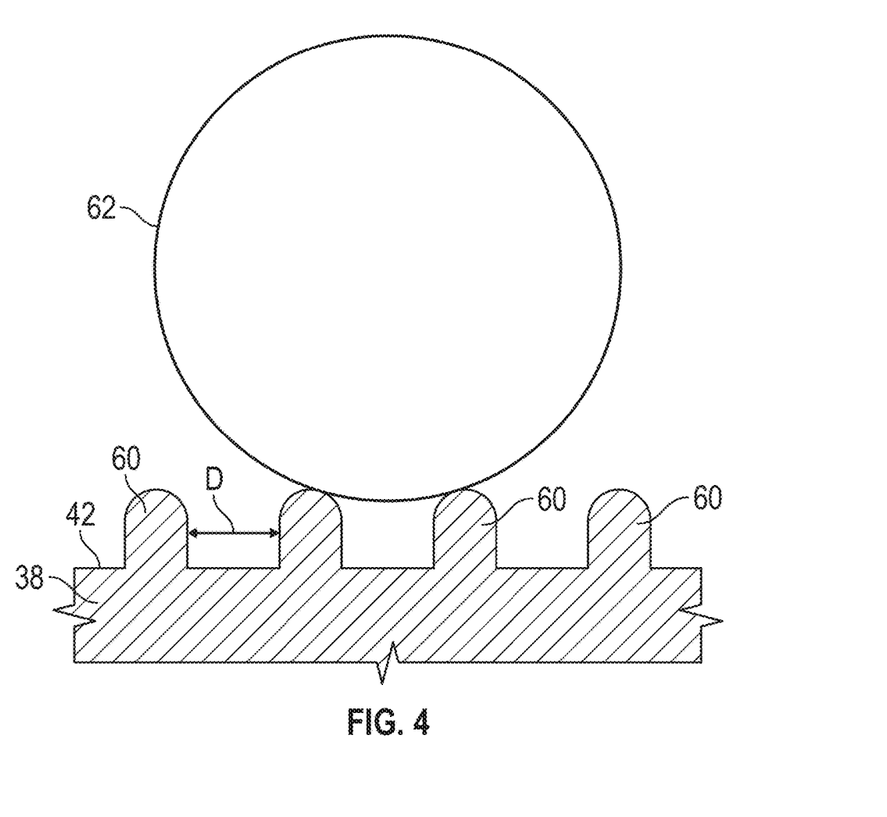
FIG. 4 is a magnified view of a surface of a lens from the lighting assembly of FIGS. 2 and 3.

One example of a lighting assembly 30 from the illumination system 12 is shown in FIGS. 2-4. The lighting assembly 30 includes a base 32 or base layer of material, a printed circuit board 34, one or more lights or light sources 36, and a lens 38 that are assembled together as a unit to be mounted to the rocker panel 22. In one example, the base 32 is comprised of a plastic material that provides sufficient compression/flexibility such that the lighting assembly 30 can handle impact loading due to rocks or other debris that may be directed against the ground facing surface 20 of the rocker panel 22.

The printed circuit board 34 comprises a flex printed circuit, thin FR4, or any other suitable circuit that is molded to, or otherwise attached to, the base 32. The light sources 36 are connected to the printed circuit board 34 in a desired configuration to provide the desired light output. In one example, the light sources 36 comprise light-emitting diodes (LEDs) that may provide a one hundred twenty degrees (120°) radiation and may have a size that is approximately 3.5×3.7 mm. Other types of light sources could also be used. The printed circuit board 34 is connected to power supply and control unit 40. The power supply and control unit 40 operates in a known manner to control when the light sources 36 are to be activated.

Because the lighting assembly 30 is mounted on the ground facing surface 20 of the rocker panel 22, there are challenges that must be addressed such as, for example, objects impacting the lighting assembly 30 in a destructive manner and dirt covering the lens 38 which reduces light output. The solution to keeping the lens 38 clean involves both geometry and materials. The geometric solution involves providing an outer surface 42 of the lens 38 with a sawtooth profile or pattern. The sawtooth profile includes a plurality of teeth 44 that are spaced apart in parallel from each other by flat surfaces 46. Each tooth 44 includes a front face 48 that faces a vehicle forward direction F and a rear face 50 that faces a vehicle rearward direction R.

In one example, the front face 48 is slanted relative to the rear face 50. The front face 48 extends from a first location L1 at the flat surface 46 to a second location L2 at a distal tip 52. The rear face 50 extends from the distal tip 52 to the flat surface 46. The front face 48 slants in a rearward direction such that the second location L2 is rearward of the first location L1. In one example, the front face 48 slants at a forty-five degree (45°) angle relative to the flat surface 46. In one example, the rear face 50 is perpendicular to the flat surface 46. These angles can be varied as needed to satisfy light output requirements.

In one example, each light source 36 is generally aligned with a flat surface 46 between adjacent teeth 44. FIG. 2 shows an LED radiation pattern 54 for one such light source 36. The most intense part of the light pattern 54 hits the flat surface 46 for good light emission. In one example, the flat surface 46 extends four millimeters (4 mm) across between adjacent teeth 44 and the rear face 50 is ten-fifteen millimeters (10-15 mm) in height. This allows the LED light source 36 to exit maximum light down towards the ground G (FIG. 1). These dimensions could be adjusted in various embodiments dependent on styling, performance, and dirt/debris testing.

The sawtooth pattern primarily protects the areas of the flat surfaces 46 and the rear face 50. The front face 48, which is slanted rearwardly, opens up a groove 56 or open area behind each tooth 44. This slanted design helps to prevent the area of the grooves 56 from being packed up with dirt or snow.

A material solution to keeping the lens 38 clean involves providing a material that will keep ice from forming on the outer surface 42 of the lens 38 and that will create a super hydrophobic surface so that water easily sheds form the lens surface. As such, the lens 38 may be molded from a material with low surface energy and with nano-scale hydrophobic features formed onto the surface of each tooth 44 and flat surface 46 to create a non-stick surface that sheds water and ice. In one example, the lens 38 is molded from polypropylene/TOP (thermoplastic olefin) resin material. This material has high impact resistance, low density, good chemical resistance, and lower surface energy, which helps to repel water from the surface.

In one example, the outer surface 42 comprises a textured surface. The textured surface reduces the contact surface area between the outer surface 42 of the lens 38 and droplets 62. This enables the droplet 62 to more easily slide off the lens 38. In one example, the textured surface comprises a plurality of protrusions or nibs 60 that extend outwardly from the outer surface 42 as shown in FIGS. 3 and 4. The nibs 60 are discrete structures that are spaced apart from each other by a predetermined distance D. In one example, the nibs 60 comprises cylindrical bodies with a rounded top. In one example configuration, each nib has a 100 nm diameter and is 150 nm tall, and there is a 200 nm spacing between adjacent nibs 60. This is just one example configuration, and other configurations could also be used in light of different styling or opening conditions. In one general example, the spacing between the nibs 60 is two times the diameter and is 1.3 times the height of the nib 60.

In one example, the nibs 60 cover an entirety of the outer surface 42 of the lens 38. As such, the nibs 60 cover the front face 48 and rear face 50 of each tooth 44, as well as, all of the flat surfaces 46 between the teeth 44. This reduces the contact area between the droplets 62 and the flat areas of the outer surface 42 (FIG. 4) such that water can be easily repelled. Further this geometry reduces dirt and grime build up.

In one example, the lens 38 is over-molded onto the light sources 36 and circuit board 34 and the over-mold includes the sawtooth profile. In another example, the sawtooth profile of the lens 38 is molded as a separate component, which is then insert molded with a remaining portion of the lens 38 over the light sources 36 and circuit board 34.

The lighting assembly 30 provides ground effect lighting that uses a combination of unique mechanical geometry and materials to keep the lens 38 clean. The sawtooth profile maximizes light output and performance while protecting light emitting surfaces from impacting debris. The textured surface of the lens 38 reduces the contact surface between the lens 38 and droplets, which significantly reduces surface energy to enable the droplets to slide off of the outer surface. Further, the printed circuit board 34 is located in the center of the lighting assembly 30, between the base 32 and lens 38, to improve flexibility so that when struck by larger objects, the board 34 can flex and absorb the impact. The optics and area of over-molding can also be customized to display a logo (solid and not translucent over-mold in defined areas), strobe (for rider guidance), messaging (advertisements, warnings, etc.), and/or to display various colors.

Figure 5:
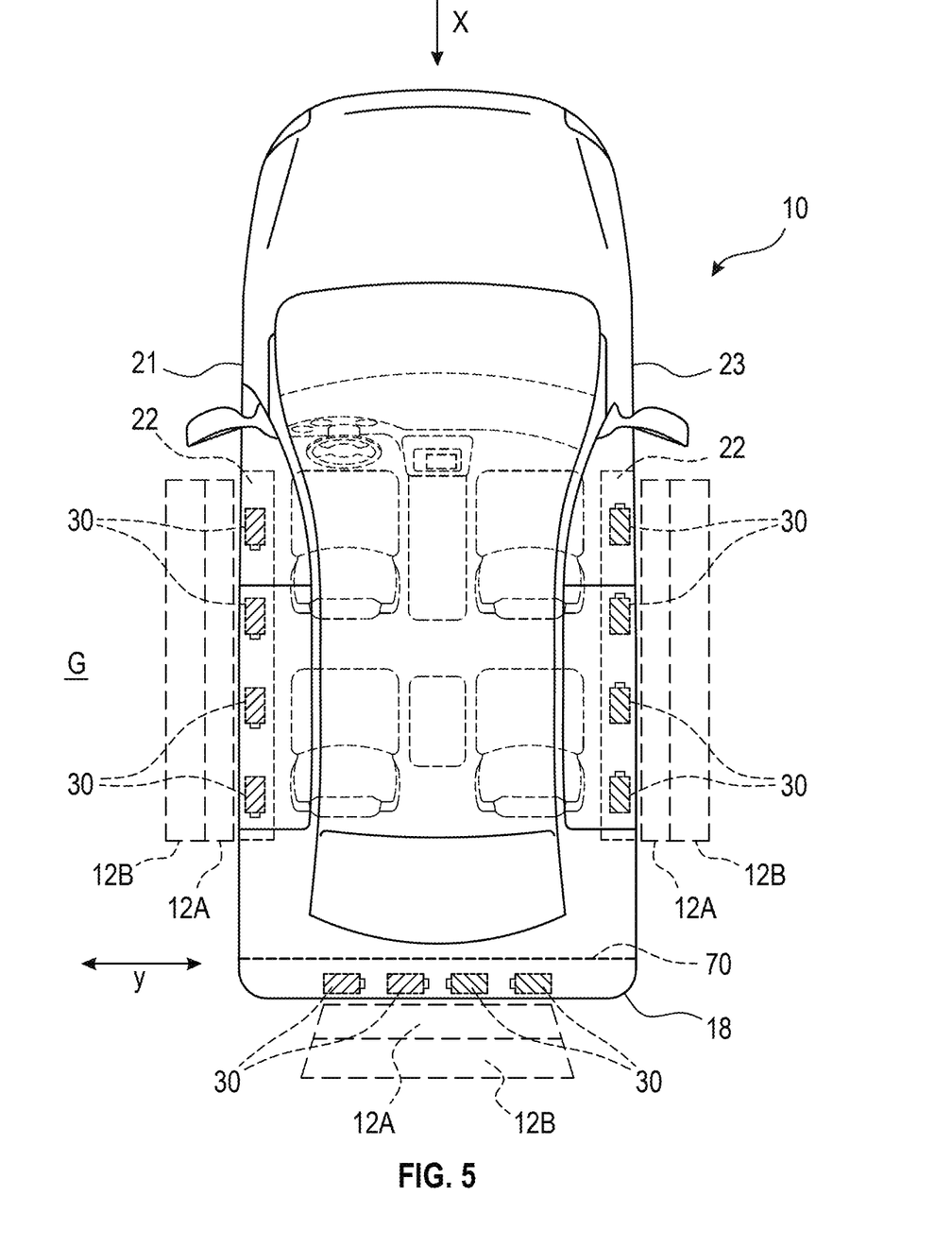
FIG. 5 is a top schematic view of a vehicle equipped with an illumination system having a plurality of lighting assemblies for illuminating the ground proximate the vehicle, according to one embodiment.

Referring to FIG. 5, a motor vehicle 10 is illustrated equipped with an illumination system 12 having a plurality of lighting assemblies 30 located on the rocker panels 22 along the lateral sides 21 and 23 and a bumper 70 at the rear 18 of the vehicle 10 to provide ground effect lighting, according to one embodiment. The illumination system 12 of the vehicle 10 is shown having four lighting assemblies 30 extending parallel to a longitudinal axis X of the vehicle 10 (i.e., longitudinally) along the left side 21 of the vehicle 10, preferably located in the rocker panel 22 and oriented for generating light illumination beams 12 onto the ground G proximate to the left side of the vehicle 10 and projecting outward from the side of the vehicle 10. Additionally, the illumination system 12 of the vehicle 10 has four lighting assemblies 30 arranged longitudinally parallel to the longitudinal axis X along the right side 23 of the vehicle 10 preferably located in the rocker panel 22 for illuminating the ground G proximate to the right side of the vehicle 10 and projecting outward from the side of the vehicle 10. Further, the illumination system 12 of the vehicle 10 has four lighting assemblies 30 located at the rear 18 of the vehicle 10, preferably in the bumper 70, and spaced laterally along a lateral axis Y of the vehicle 10 (i.e., laterally) across the rear 18 of the vehicle 10 for illuminating the ground proximate to the rear 18 of the vehicle 10 and projecting rearward of the vehicle 10.

The lighting assemblies 30 are each configured having a lens 38 with a sawtooth pattern that is oriented at an angle relative to the housing of the lighting assembly 30 such that when the lighting assembly 30 is mounted on the vehicle 10 either longitudinally or laterally, the sawtooth pattern lens 38 is oriented at an angle in the range of thirty to sixty degrees (30°-60°), more particularly in the range of approximately forty to fifty degrees (40°-50°), and preferably approximately forty-five degrees (45°), according to one exemplary embodiment. The four lighting assemblies 30 located on the left side 21 of the vehicle 10 are all oriented along the longitudinal axis X of the vehicle 10 such that the sawtooth pattern has an angle of approximately forty-five degrees (45°) relative to the longitudinal axis X of the vehicle 10. Similarly, the four lighting assemblies 30 located on the right side 23 of the vehicle 10 are oriented and arranged along the longitudinal axis X of the vehicle 10 such that the lens 38 has the sawtooth pattern at an angle forty-five degrees (45°) relative to the longitudinal axis X of the vehicle 10. The lighting assemblies 30 on the left side 21 of the vehicle 10 have housings 32 that may be oriented one hundred eighty degrees (180°) relative to the housings 32 on the lighting assemblies 30 on the right side 23 of the vehicle 10. The lighting assemblies 30 each employ a lens 38 having an angled sawtooth pattern that is oriented generally forward at approximately forty-five degrees (45°) relative to the longitudinal axis X of the vehicle 10 on both sides of the vehicle 10. While separate lenses 38 may be required for the left and right side lighting assemblies 30, the housings 32 may be configured in a universal lighting package that enables each lighting assembly 30 to be used on either side of the vehicle 10 with the corresponding lens 38.

The lighting assemblies 30 located on the rear 18 of the vehicle 10 are shown having a first pair of lighting assemblies 30 oriented in a first direction along the lateral axis Y of the vehicle 10 and a second pair of lighting assemblies oriented in opposite directions along the lateral axis Y. Each of the first and second pairs of light assemblies 30 at the rear 18 of the vehicle has a lens 38 with an angled sawtooth pattern oriented at approximately forty-five degrees (45°) relative to the lateral axis Y. The first pair of lighting assemblies 30 on the left side of the rear 18 of vehicle 10 have a sawtooth lens pattern angled outward towards the left side at an angle of forty-five degrees (45°). The second pair of lighting assemblies 30 on the right side of the rear 18 of the vehicle have a sawtooth lens pattern angled outward towards the right side at an angle of forty-five degrees (45°).

By orienting the sawtooth pattern of the lens 38 at an angle such as of approximately forty-five degrees (45°), the lighting assemblies 30 with the corresponding lenses 38 may be used on opposite lateral sides of the vehicle 10 and on the rear 18 to illuminate light on the ground G proximate to the lateral sides 21 and 23 and rear 18 of the vehicle 10. Additionally, the approximately forty-five degree (45°) angle orientation of the sawtooth pattern of the lens 38 allows for the sawtooth pattern of the lens 38 to be oriented to minimize the amount of dirt and debris that may otherwise be collected on the lens 38. It should be appreciated that the vehicle 10 traveling forward may generate a swirl effect around the tires and the rear corners of the vehicle 10 which may contaminate the lens 38. By orienting the sawtooth pattern of the lens 38 at an angle of approximately forty-five degrees (45°), the amount of debris accumulated on the lens 38 is reduced or minimized.

Figure 6:
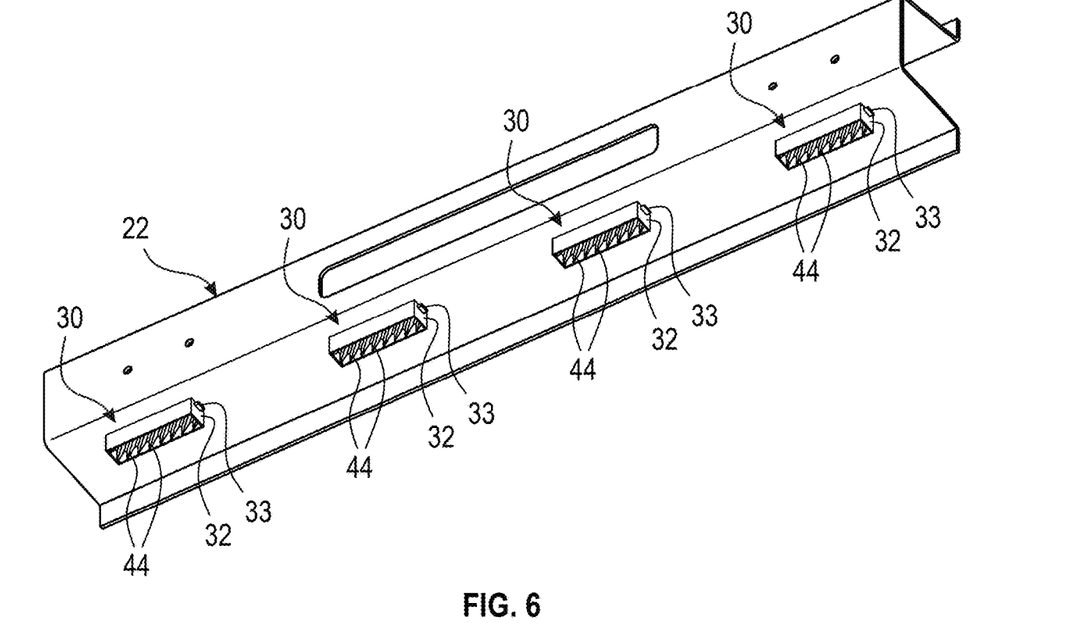
FIG. 6 is a side perspective view of a portion of the rocker panel having a plurality of lighting assemblies shown in FIG. 5.
Figure 7:
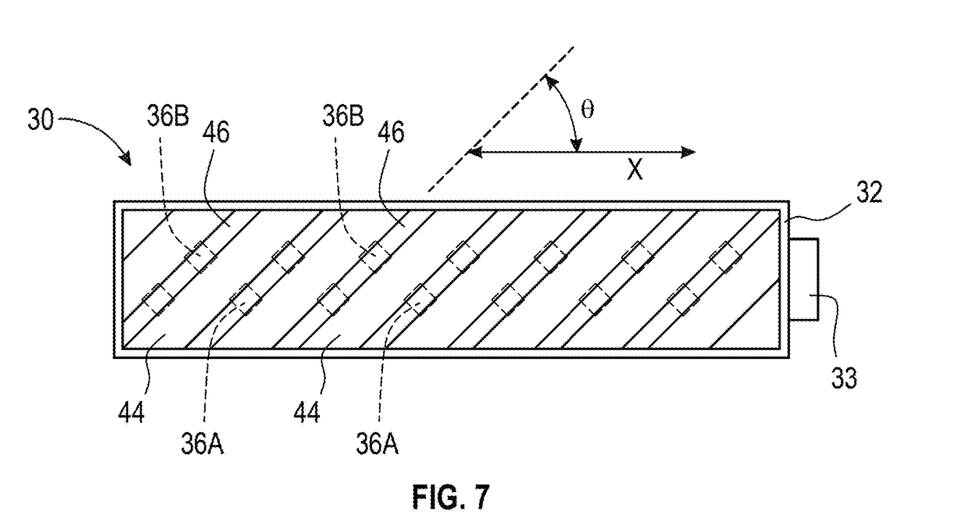
FIG. 7 is an enlarged top view of one of the lighting assemblies having an angled sawtooth pattern in the lens, according to one embodiment.

Referring to FIGS. 6 and 7, the lighting assembly 30 is shown mounted on a rocker panel 22 which may be located on the right side of the vehicle 10 as seen in FIG. 5. The sawtooth pattern profile of the lens 38 is oriented at an angle θ in the range of approximately thirty to sixty degrees (30° to 60°) relative to the longitudinal axis X of the vehicle 10, more particularly at an angle θ in the range of approximately forty-fifty degrees (40° to 50°), and preferably at an angle approximately forty-five degrees (45°). The lighting assembly 30 is shown having a sawtooth wave form pattern of lens 38 aligned at an angle θ relative to the longitudinal axis X of the vehicle 10. It should be appreciated that the longitudinal axis X is perpendicular to the lateral axis Y such that the angle of the sawtooth pattern relative to the lateral axis Y likewise may be in the range of approximately thirty-sixty degrees (30 to 60°), and more particularly in the range of approximately forty-fifty degrees (40 to 50°), and more particularly about approximately forty-five degrees (45°).

Figure 8:
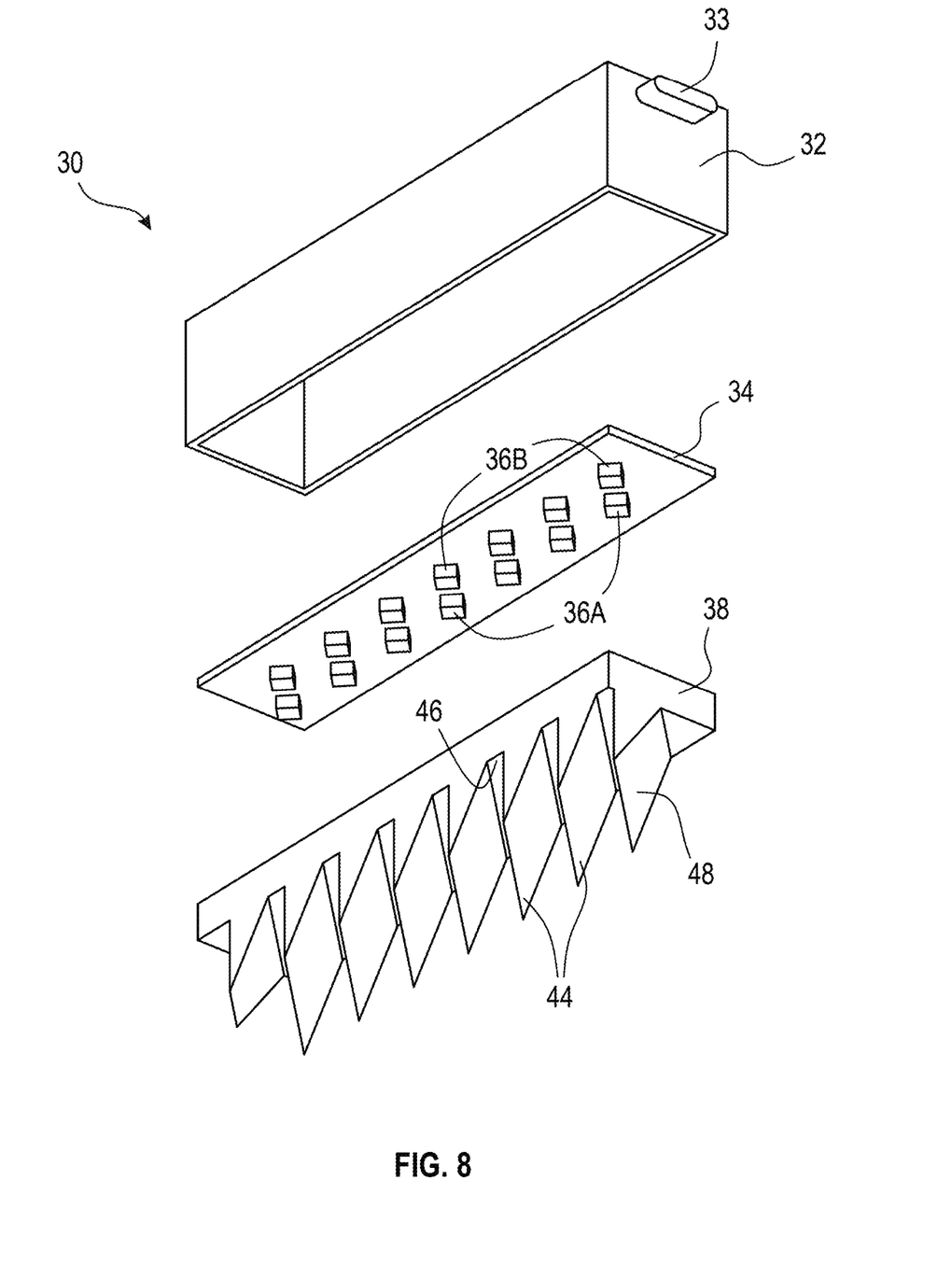
FIG. 8 is an exploded view of the lighting assembly shown in FIG. 7.
Figure 9:
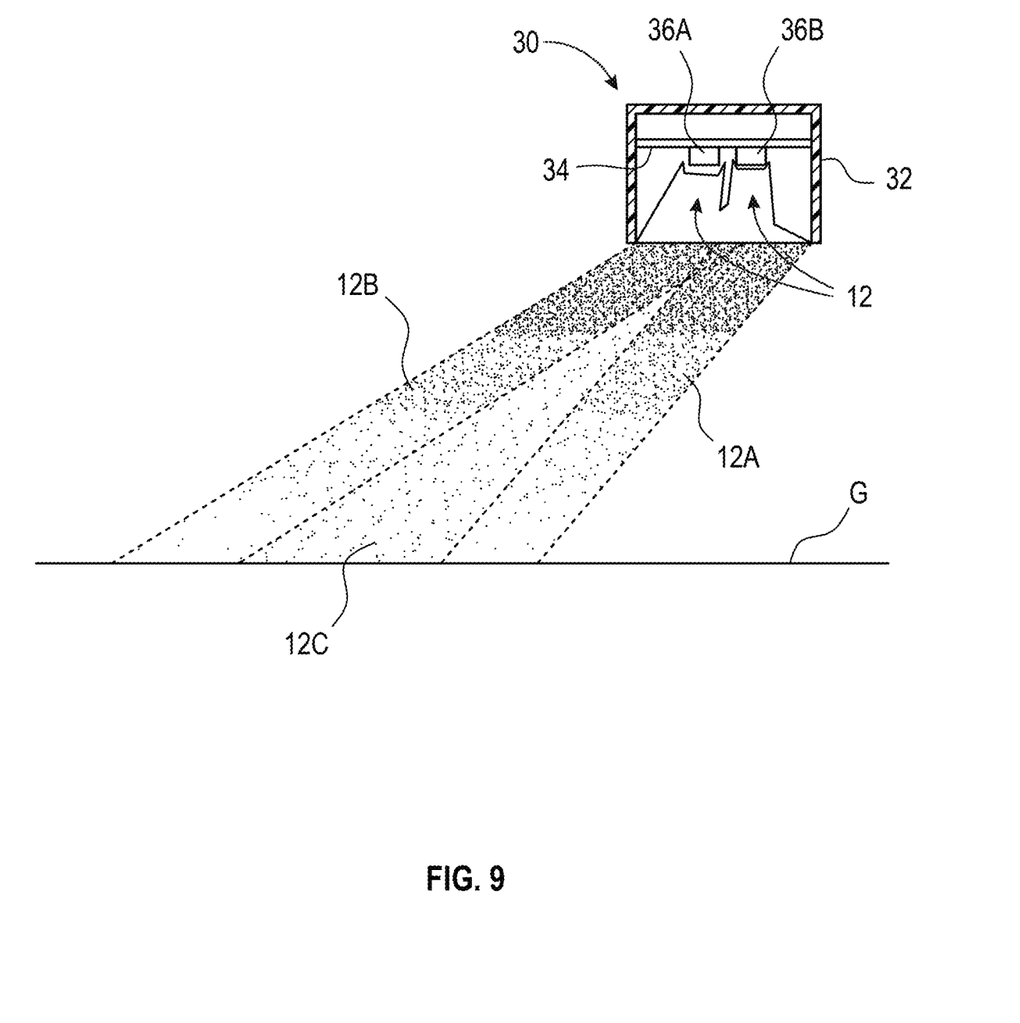
FIG. 9 is a side schematic view of the lighting assembly illuminating the ground with first and second light beams projected through the angled sawtooth patterned lens.

As seen in FIGS. 7-9, the lighting assembly 30 is shown including a plurality of light sources mounted on circuit board 34 which is located rearward of the lens 38. The lens 38 and circuit board 34 with light sources are housed within a housing 32 which includes an electrical connector 33 for connecting to a power supply to power the light sources. The sawtooth pattern of the lens 38 is oriented at angle θ relative to the longitudinal axis or length of the housing 32 such that, when the housing 32 is oriented along the longitudinal axis X or lateral axis Y of the vehicle 10, the sawtooth pattern of the lens 38 is oriented at angle θ relative to the respective longitudinal axis X or lateral axis Y of the vehicle 10.

The light sources include a first plurality of light sources 36A and a second plurality of light sources 36B. The first plurality of light sources 36A may emit light at a first color, such as amber light and the second plurality of light source may emit light of a second color, such as white light. The first and second plurality of light sources 36A and 36B are arranged within the lighting assembly 30 such that pairs of the first and second light sources 36A and 36B are positioned proximate to the flat surface 46 of the lens 38. As such, each flat surface 46 of lens 38 has a pair of light sources 36A and 36B, preferably in the form of LEDs with one light source illuminating an amber color light onto the ground surface G and the other light source illuminating a white color light onto the ground surface G.

The lens 38 directs the light beam output from each of the first and second LEDs 36A and 36B outward onto the ground surface G within beam patterns 12A and 12B as shown in FIG. 9. It should be appreciated that the light beam outputs 12A and 12B from respective light sources 36A and 36B passing through lens 38 overlap such that an overlapping transition portion 12C is present between light beam outputs 12A and 12B. It should be appreciated that select ones of the light sources 36A and 36B may be controlled to turn the light sources 36A and 36B on and off and to transition the lighting color therebetween by controlling a pulse width modulation signal of the LEDs.

The light beam outputs 12A and 12B generated by the illumination system 12 may be utilized on the vehicle 10 as an indicator to warn bystanders or potential passengers to be cautious or stay away from a particular lighted zone around the vehicle 10 when the first color amber light is on and to illuminate an area of the vehicle with the second color white light for entry, such as a door when a passenger is expected to enter or exit the vehicle 10. As such, a white light may indicate those zones on the ground surface G around the vehicle 10 upon which a person may enter and the amber light may indicate those zones on the ground surface G that a person should be cautious or refrain from entry.

The illumination system 12 may include any number of lighting assemblies 30 arranged on the vehicle 10 to effect ground lighting on the ground surface G on any side of the lateral sides, the rear side and the front side of the vehicle 10. Each lighting assembly 30 may include one or more light sources generating any number of light colors and may include any number of teeth of the sawtooth pattern lens 38.

The illumination system 12 advantageously provides for ground effect lighting around the vehicle with a sawtooth lens orientation that is less prone to contamination from dirt and other debris that may otherwise adhere to the lens 38 due to the swirl effect of air as the air and potential contaminants passes around the vehicle 10. The corresponding left and right sawtooth lenses 38 may also be used in a housing 32 that may provide a universal lighting assembly module that may be used on multiple sides of the vehicle 10.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
a first lighting assembly located on a side of the vehicle for illuminating light directed downward toward ground level, said first light assembly comprising a light source fixed to a vehicle mount structure and a lens covering the light source, wherein the lens includes an outer surface having a sawtooth profile, wherein the sawtooth profile is oriented at a first angle in a range of approximately 30 to 60 degrees relative to a longitudinal or lateral axis of the vehicle; and
a second lighting assembly located on a side of the vehicle for illuminating light directed downward toward ground level, said second light assembly comprising a light source fixed to a vehicle mount structure and a lens covering the light source, wherein the lens includes an outer surface having a sawtooth profile, and wherein the sawtooth profile is oriented at a second angle in a range of approximately 30 to 60 degrees relative to a longitudinal or lateral axis of the vehicle, wherein the second lighting assembly is rotated 180 degrees relative to the first lighting assembly.

2. The vehicle of claim 1, wherein the first lighting assembly is located proximate to a rocker panel on a first side of the vehicle and the second lighting assembly is located proximate to a second rocker panel on an opposite side of the vehicle.

3. The vehicle of claim 1, wherein the first lighting assembly is located at a rear of the vehicle and the second light source is located at the rear of the vehicle.

4. The vehicle according to claim 1, wherein each of the first and second angles is in a range of approximately 40 to 50 degrees.

5. The vehicle according to claim 3, wherein each of the first and second angles is approximately 45 degrees.

6. A method of configuring a vehicle with ground lighting comprising:
providing first and second light assemblies having respective first and second light sources and first and second lenses covering the respective first and second light sources, wherein the second light assembly is rotated 180 degrees relative to the first light assembly;

fixing the first light assembly on a first side of the vehicle to provide ground effect lighting, wherein the first lens includes an outer surface having a sawtooth profile oriented at a first angle in a range of approximately 30 to 60 degrees relative to a longitudinal axis or a lateral axis of the vehicle;

fixing the second light assembly on an opposite side of the vehicle to provide ground lighting, wherein the second lens includes an outer surface having a sawtooth profile oriented at a second angle in a range of approximately 30 to 60 degrees relative to the longitudinal axis or lateral the axis of the vehicle; and activating the first and second light assemblies to generate ground effect lighting.

7. The method of claim 6 further comprising the step of fixing a third light assembly at a rear of the vehicle and a fourth light assembly at the rear of the vehicle.

8. The method of claim 6, wherein each of the first and second angles is in a range of approximately 40 to 50 degrees.

9. The method of claim 6, wherein each of the first and second angles is approximately 45 degrees.

10. The method of claim 6, wherein the light assembly is located on a first rocker panel and the second light assembly is located on a second rocker panel.

11. The method of claim 6, wherein the first second light assemblies are located on a rear bumper.

* * * * *